(12) United States Patent
Wong et al.

(10) Patent No.: US 11,864,240 B2
(45) Date of Patent: *Jan. 2, 2024

(54) TELECOMMUNICATIONS APPARATUS AND METHODS

(71) Applicant: Sony Group Corporation, Tokyo (JP)

(72) Inventors: Shin Horng Wong, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,471

(22) Filed: Dec. 30, 2022

(65) Prior Publication Data

US 2023/0137787 A1    May 4, 2023

Related U.S. Application Data

(63) Continuation of application No. 16/966,044, filed as application No. PCT/EP2019/052514 on Feb. 1, 2019, now Pat. No. 11,570,819.

(30) Foreign Application Priority Data

Feb. 2, 2018  (EP) .................................... 18154993

(51) Int. Cl.
*H04W 74/08* (2009.01)
*H04W 48/16* (2009.01)
(Continued)

(52) U.S. Cl.
CPC ....... *H04W 74/0833* (2013.01); *H04W 48/16* (2013.01); *H04W 72/0453* (2013.01); *H04W 72/23* (2023.01); *H04W 74/002* (2013.01)

(58) Field of Classification Search
CPC ............. H04W 74/0833; H04W 48/16; H04W 72/042; H04W 72/0453; H04W 74/002; H04W 8/24; H04W 80/02; H04W 76/25; H04W 76/10; H04W 74/004; H04W 76/18; H04L 1/0025; H04L 5/0094
See application file for complete search history.

(56) References Cited

U.S. PATENT DOCUMENTS 10,694,574 B2    6/2020  Lee et al.
10,779,333 B2 *  9/2020  Ye ..................... H04W 74/0833
(Continued)

OTHER PUBLICATIONS

Samsung; "Early data transmission for eMTC", 3GPP Draft; R1-1720260, 3rd Generation Partnership Project (3GPP), Reno; USA; vol. RAN WG1, Meeting #91, Nov. 27, 2017 to Dec. 1, 2017 (Year: 2017).*

(Continued)

*Primary Examiner* — Brian T O Connor
(74) *Attorney, Agent, or Firm* — XSENSUS LLP

(57) ABSTRACT

A method of operating a base station in a wireless telecommunications system to support a first random access procedure for a first terminal device of a first type and a second random access procedure for a second terminal device of a second type, wherein a message size for an uplink message of the second random access procedure is greater than a message size for a corresponding uplink message of the first random access procedure.

20 Claims, 5 Drawing Sheets

(51) Int. Cl.
*H04W 72/0453* (2023.01)
*H04W 74/00* (2009.01)
*H04W 72/23* (2023.01)

(56) References Cited

U.S. PATENT DOCUMENTS

| | | | |
|---|---|---|---|
| 11,039,477 B2 | 6/2021 | Charbit et al. | |
| 11,395,182 B2* | 7/2022 | Liu | H04L 5/0053 |
| 11,528,753 B2* | 12/2022 | Wong | H04L 1/1896 |
| 11,533,760 B2* | 12/2022 | Wong | H04W 72/1263 |
| 11,570,819 B2* | 1/2023 | Wong | H04W 74/002 |
| 11,632,806 B2* | 4/2023 | Beale | H04W 74/002 |
| | | | 370/329 |
| 2017/0013391 A1 | 1/2017 | Rico Alvarino et al. | |
| 2019/0141515 A1 | 5/2019 | Kim et al. | |
| 2019/0159260 A1 | 5/2019 | Charbit et al. | |
| 2019/0350037 A1 | 11/2019 | Lee et al. | |
| 2020/0245242 A1 | 7/2020 | Höglund et al. | |
| 2020/0245370 A1 | 7/2020 | Höglund et al. | |
| 2020/0374934 A1 | 11/2020 | Koskinen et al. | |
| 2020/0374966 A1 | 11/2020 | Chang et al. | |

OTHER PUBLICATIONS

Huawei, Hisilicon; "PRACH partitioning for early data transmission", 3GPP Draft; R2-1713188, 3rd Generation Partnership Project (3GPP), Reno; USA; vol. RAN WG2, Meeting #100, Nov. 27, 2017 to Dec. 1, 2017 (Year: 2017).*

International Search Report and Written Opinion dated Mar. 25, 2019 for PCT/EP2019/052514 filed on Feb. 1, 2019, 10 pages.

Holma, H., and Toskala, A., "System Architecture Based on 3GPP SAE," LTE for UMTS: OFDMA and SC-FDMA Based Radio Access, John Wiley & Sons, Ltd., Apr. 2009, pp. 25-27.

Ericsson and Qualcomm, "New WID on Even further enhanced MTC for LTE," 3GPP TSG RAN Meeting No. 75, RP-170732 (revision of RP-170465), Dubrovnik, Croatia, Mar. 6-9, 2017, 4 pages.

Ericsson, "Early data transmission for MTC," 3GPP TSG-RAN WG1 Meeting No. 91, R1-1719350, Reno, Nevada, USA, Nov. 27-Dec. 1, 2017, pp. 1-5.

Ericsson, "Revised WID for Further Enhanced MTC for LTE," 3GPP TSG RAN Meeting No. 73, RP-161464, revision of RP-161321, New Orleans, USA, Sep. 19-22, 2016, 6 pages.

Huawei and Hisilicon, "Revised work item proposal: Enhancements of NB-IoT," 3GPP TSG RAN Meeting No. 73, RP-16190, revision of RP-161324, New Orleans, USA, Sep. 19-22, 2016, 8 pages.

Huawei, et al., "New WID on Further NB-IoT enhancements," 3GPP TSG RAN Meeting No. 75, RP-170852, Dubrovnik, Croatia, Mar. 6-9, 2017, 6 pages.

ZTE, "Remaining issues for EDT," 3GPP TSG-RAN WG2 Meeting No. 100, R2-1712982, Reno, Nevada, USA, Nov. 24-Dec. 1, 2017, pp. 1-8.

* cited by examiner

TELECOMMUNICATIONS APPARATUS AND METHODS

CROSS-REFERENCE TO RELATED APPLICATIONS

The present application is a continuation of U.S. patent application Ser. No. 16/966,044, filed Jul. 30, 2020, which is based on PCT filing PCT/EP2019/052514, filed Feb. 1, 2019, and claims priority to EP 18154993.2, filed Feb. 2, 2018, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data-rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance.

In view of this there is expected to be a desire for future wireless communications networks, for example those which may be referred to as 5G or new radio (NR) system/ new radio access technology (RAT) systems, as well as future iterations/releases of existing systems, to efficiently support connectivity for a wide range of devices associated with different applications and different characteristic data traffic profiles.

One example area of current interest in this regard includes the so-called "Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data. It is further expected some of these types of device may be required to operate in areas of relatively poor coverage, for example, in a basement or other location with relatively high penetration loss (e.g. for smart meter type applications), or in remote locations (e.g. for remote monitoring applications), and this has given rise to proposals for enhancing coverage, for example using repeat transmissions.

The increasing use of different types of terminal devices associated with different traffic profiles and requirements for coverage enhancement gives rise to new challenges for efficiently handling communications in wireless telecommunications systems that need to be addressed.

SUMMARY

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
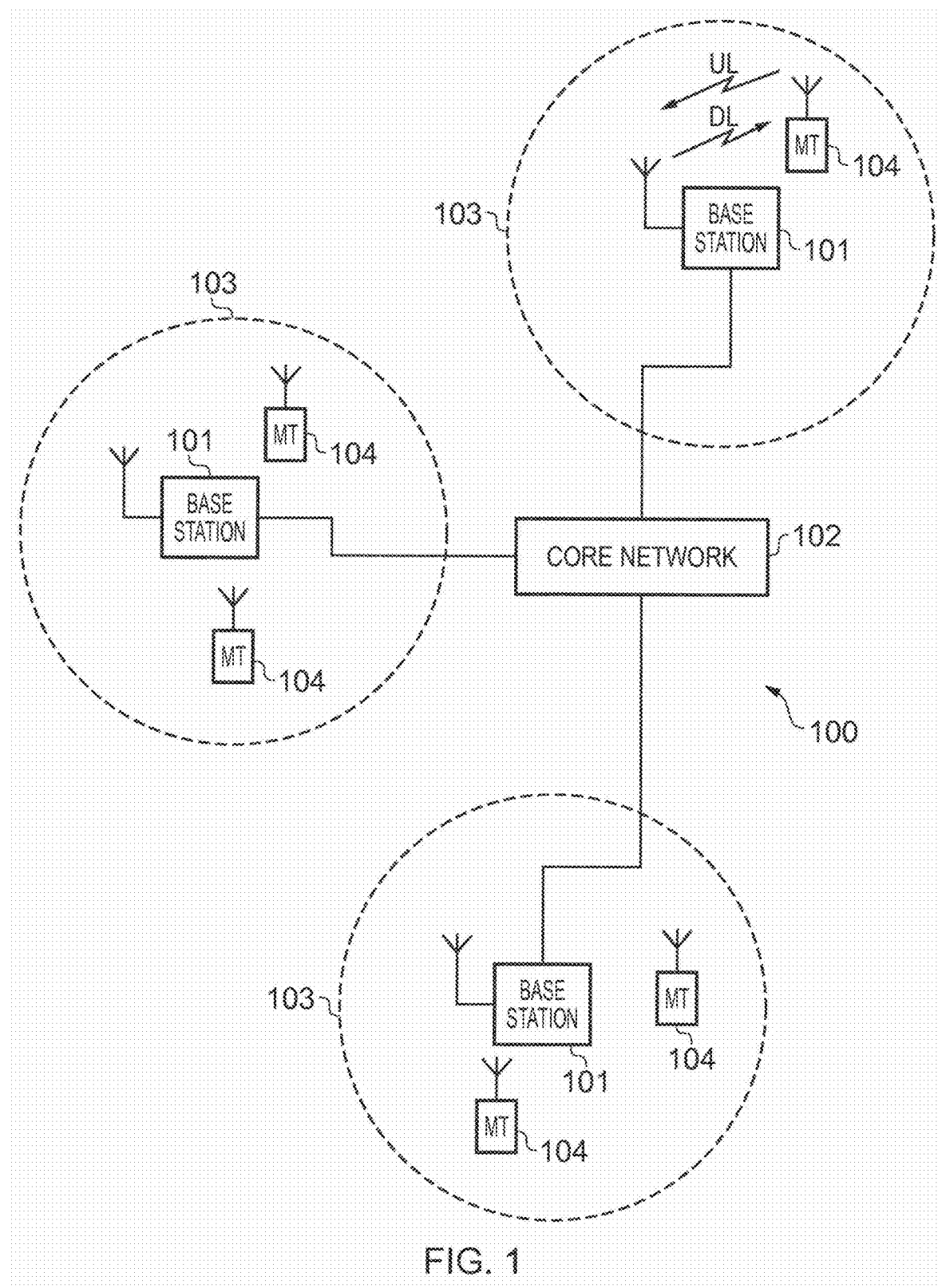
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

While certain embodiments may be generally described herein in relation to the network architecture represented in FIG. 1, it will be appreciated corresponding approaches may equally be adopted in networks conforming to other overall configurations, for example configurations associated with proposed approaches for new radio access technology (RAT), NR, wireless mobile telecommunications networks/systems. A new RAT network may comprise communication cells that each comprise a controlling node in communication with a core network component and a plurality of distributed units (radio access nodes/remote transmission and reception points (TRPs)) within the cell. The distributed units may be responsible for providing the radio access interface for terminal devices connected to the NR network. Each distributed unit has a coverage area (radio access footprint) which together define the coverage of the communication cell. Each distributed unit includes transceiver circuitry for transmission and reception of wireless signals and processor circuitry configured to control the respective distributed units. In terms of broad top-level functionality, the core network component of such a new RAT telecommunications system may be broadly considered to correspond with the core network 102 represented in FIG. 1, and the respective controlling nodes and their associated distributed units/TRPs may be broadly considered to provide functionality corresponding to base stations of FIG. 1. Thus, the term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs. A terminal device operating in this proposed new RAT architecture may thus exchange signalling with a first controlling node via one or more of the distributed units associated with the controlling node. In some implementations the involvement of the distributed units in routing communications from the terminal device to a controlling node (controlling unit) may be transparent to the terminal device. It will further be appreciated this example represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architecture shown in FIG. 1. It will be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node and/or a TRP in a new RAT architecture of the kind discussed above.

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in RRC idle mode to exchange data with a network involves the terminal device first performing an RRC connection procedure (random access procedure) with the network. The RRC connection procedure involves the UE initially transmitting a random access request message (which may be triggered autonomously by the UE determining it has data to transmit to the network or in response to the network instructing the UE to connect to the network). This is followed by RRC control message exchange between the network and UE. After establishing an RRC connection and exchanging the relevant data, the UE may then perform RRC disconnection and move back into idle mode for power saving. This conventional approach may for convenience be referred to herein as a legacy approach.

The random access procedure can be relatively inefficient if the amount of data to be communicated with the network is relatively small, for example in terms of signalling overhead and associated UE power usage. There have therefore been proposals for a UE to communicate higher-layer/user plane data with the network during the RRC connection procedure itself. One approach for this is referred to as Early Data Transmission (EDT) and allows the UE to transmit and/or receive data during the Random Access process whilst in idle mode, thereby communicating the relevant data without the need to complete the establishment of an RRC connection, which can be particularly helpful for infrequent and short messages type of traffic.

Figure 2:
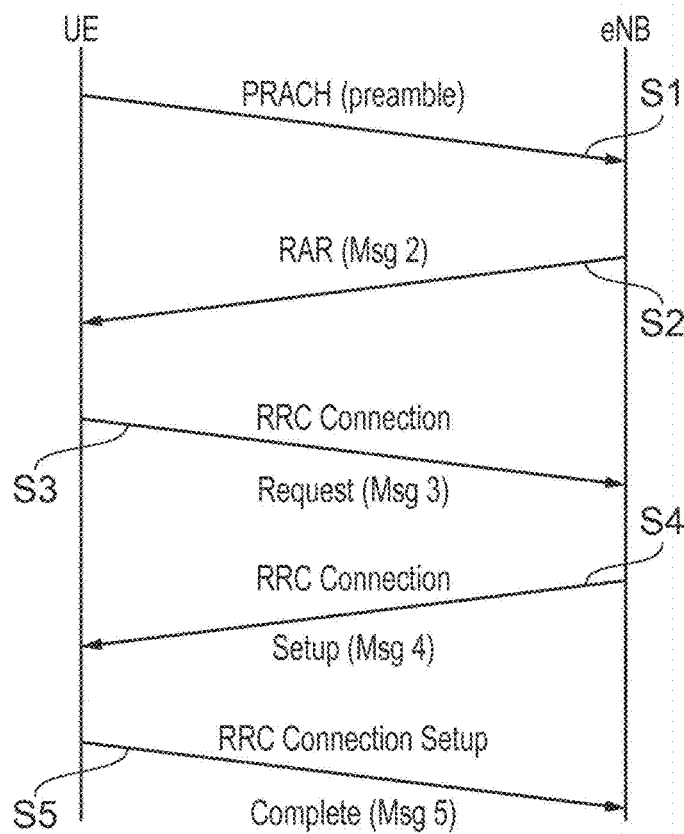
FIG. 2 schematically represents steps in a random access procedure in a wireless telecommunication network.

FIG. 2 is a ladder diagram that schematically shows message exchange between a UE and an eNB in a typical random access procedure to establish an RRC connection, in this example in an LTE-based network. The UE starts the process in step S1 by transmitting a random access request on a physical random access channel (PRACH in an LTE context), i.e. a random access preamble (RACH preamble), to the eNB. In step S2, when the eNB detects this preamble it will respond with a Random Access Response message (RAR), which is also known as Message 2. The RAR is scheduled by DCI (downlink control information) carried on a physical downlink control channel, e.g. MPDCCH in an LTE implementation for machine type communication (MTC) traffic, in a predefined Common Search Space (CSS). The RAR itself is transmitted on a physical downlink shared channel (PDSCH) resource allocated via the DCI. The DCI is addressed to an RA-RNTI (random access radio network temporary identifier) which is derived from the time and frequency resources used to transmit the preamble in step S1 and the RAR will indicate which preamble the eNB has detected and is responding to. It may be noted it is possible that multiple UEs may transmit a random access request using the same PRACH preamble and the same time and frequency resources. The RAR of step S2 also contains an uplink grant for the preamble the network is responding to so that the UE that transmitted the preamble may use this uplink grant to transmit an RRC Connection Request message, also known as Message 3 to the eNB, in step S3. Message 3 also contains an indication of an identifier, ID, for the UE (e.g. a C-RNTI (cell radio network temporary identifier) or S-TMSI (system architecture evolution (SAE) temporary mobile subscriber identity) or a 40-bit random number generated by the UE. The eNB will respond to Message 3, in step S4, with Message 4 which carries a RRC Connection Setup message. For the case where multiple UEs use the same preamble, Message 4 provides contention resolution functionality, for example using a terminal device identifier, such as C-RNTI or S-TMSI, transmitted in Message 3 (when a UE receives a Message 4 that contains a portion of the Message 3 containing the UE ID that it transmitted earlier, it knows that there was no contention on the Message 3 that it had transmitted). The RRC connection is complete when the UE transmits Message 5 in step S5 containing a RRC Connection Setup Complete message.

A previously proposed approach for EDT in uplink is for additional data to be transmitted in association with the RRC connection request message, in Message 3 (step S3 in FIG. 2). For the legacy approach to random access, Message 3 carries only control messages and therefore has a limited Transport Block Size (TBS). In order for Message 3 to carry more useful amounts of data, the 3GPP group has agreed to allow for an increase in the TBS for Message 3 to 1000 bits. However, it has also been agreed that an eNB need not fulfil an EDT request by allocating resources for a TBS for Message 3 to 1000 bits, but the eNB can instead schedule a smaller TBS as for a legacy Message 3, for example having regard to overall resource availability. In this case the UE may, for example, need to follow the legacy approach of establishing an RRC connection to communicate the data rather than using EDT.

In order for the eNB to identify whether a UE has EDT capability/is requesting an allocation of radio resources for EDT in Message 3, it has been proposed that a set of available PRACH preambles be partitioned such that a sub-group of PRACH preambles is used by a UE supporting EDT to indicate to the eNB its capability and to request EDT over Message 3. Since partitioning the PRACH preambles would result in fewer PRACH resources for legacy (non-EDT) UEs, one possible implementation is to allow legacy UEs without EDT capability to also use the PRACH preambles partitioned for use by EDT capable UEs. This follows from a general preference to avoid partitioning PRACH resources so far as possible since partitioning of resources can impact trunking efficiency and reduce statistical multiplexing gain.

Figure 3:
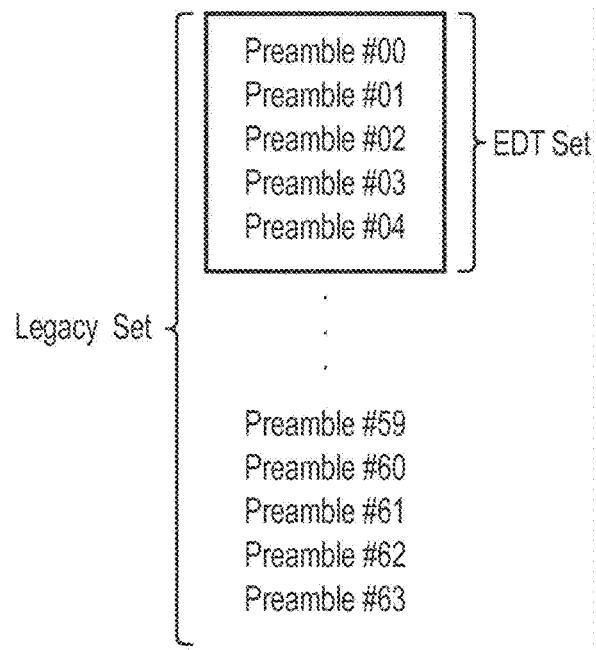
FIG. 3 schematically represents an example allocation of PRACH preambles for use by different types of terminal device.

FIG. 3 schematically represents one approach for allocating PRACH preambles for use by legacy UEs and EDT-capable UEs (which may be referred to hereon as EDT-UEs). In this example the eNB has 64 PRACH preambles, i.e., {Preamble #00, Preamble #01, . . . , Preamble #63}. A partition comprising of 5 preambles is allocated for use by EDT-UEs to indicate their EDT capability, i.e. EDT Set={Preamble #00, Preamble #01, Preamble #02, Preamble #03, Preamble #04} in the example of FIG. 3. In accordance with the principles noted above, to help maximize the PRACH preamble resource for legacy UEs, the legacy UEs are allowed to use all 64 PRACH preambles, including those in the EDT set, i.e. Legacy Set={Preamble #00, Preamble #01, . . . , Preamble #63}.

A drawback of allowing legacy UEs to use the same PRACH preambles as EDT UEs is that the eNB would not generally know when it first detects a PRACH preamble from within the EDT Set whether is comes from a legacy UE or an EDT UE. It has been proposed for the RAR (Message 2) response sent from the eNB to include an indication of whether or not the RAR is allocating resources for EDT in Message 3. This can be achieved by using an existing spare/reserved bit in RAR to provide a flag for such an indication. Since a legacy UE would in effect ignore the spare/reserved bit, the legacy UE will assume a TBS for a legacy Message 3 is scheduled e.g., the legacy UE will use a legacy MCS (modulation code scheme) table to derive TBS in the normal way. However, an EDT capable UE may be configured to recognize the setting of the reserved bit in the RAR to indicate an EDT allocation for Message 3 and use an EDT MCS table accordingly. The eNodeB can then perform blind decoding operations on the Message 3 (under the hypotheses that (i) the UE is EDT capable and (ii) the UE is a legacy UE) in order to decode Message 3. As noted above, it is possible more than one UE may use the same preamble and time and frequency resources to access the network, and so it is therefore possible for a legacy UE and an EDT capable UE to use the same preamble.

Certain embodiments of the disclosure propose to allow a base station (eNB) to independently configure a Common Search Space (CSS) for scheduling messages for EDT capable UEs (which may be referred to herein as an EDT-CSS) and for legacy UEs during the RACH process. i.e., search spaces are independently configured for legacy UEs and EDT capable UEs. This can help reduce the impact of contention and/or interference arising if a legacy terminal device and an EDT-capable terminal device initiate a request for random access using the same random access preamble and radio resources.

Figure 4:
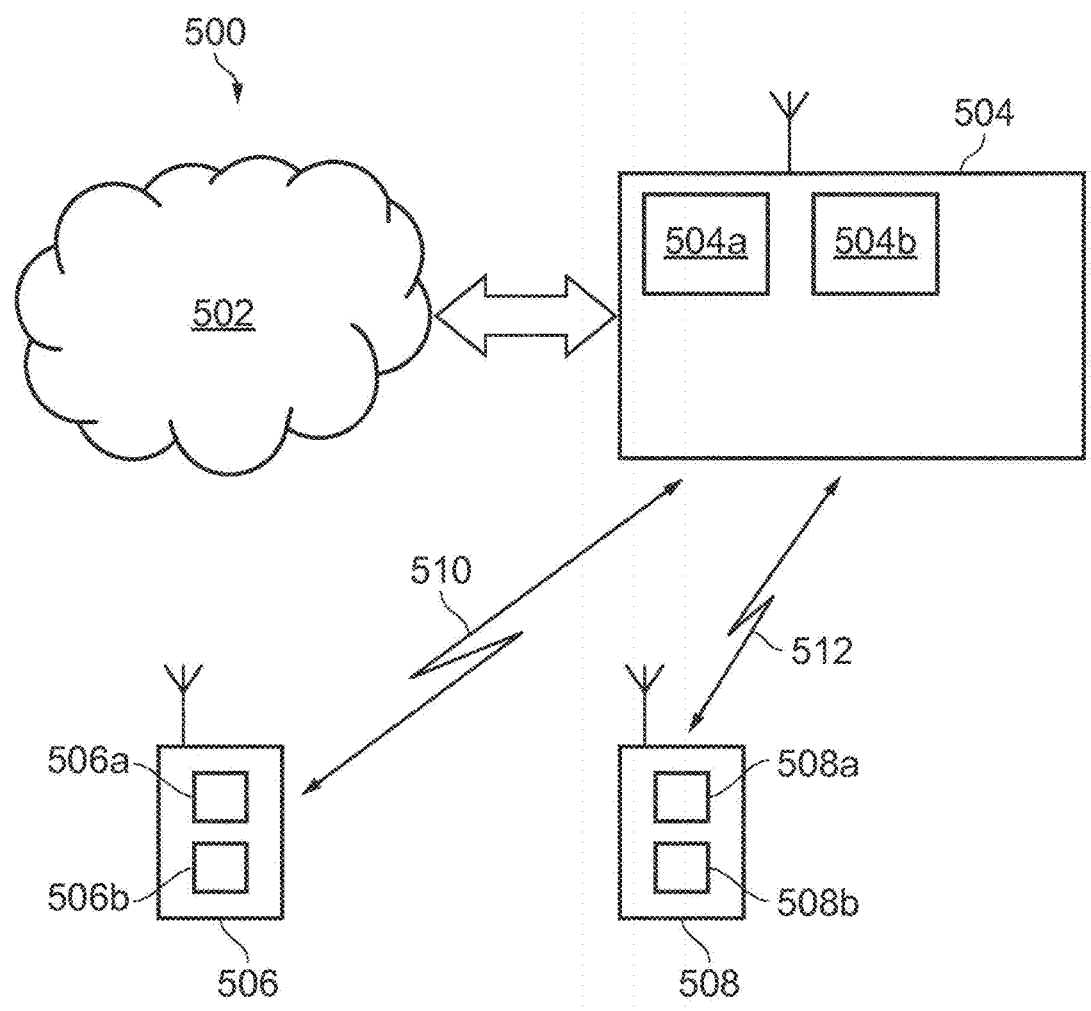
FIG. 4 schematically represents some aspects of a wireless telecommunication system in accordance with certain embodiments of the present disclosure.

FIG. 4 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 4 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service (EPS) connections with the terminal devices 506, 508 operating in the communications system based on subscriber information stored in a home subscriber server (HSS). Other network components in the core network (also not shown for simplicity) include a policy charging and resource function (PCRF) and a packet data network gateway (PDN-GW) which provides a connection from the core network part 502 to an external packet data network, for example the Internet. As noted above, the operation of the various elements of the communications system 500 shown in FIG. 4 may be broadly conventional apart from where modified to provide functionality in accordance with embodiments of the present disclosure as discussed herein.

In this example, it is assumed the first terminal device 506 is a conventional smartphone-type terminal device communicating with the base station 504 in a conventional manner (i.e. the first terminal device is a legacy terminal device that does not support EDT). It will be appreciated the first terminal device need not be a smartphone-type terminal device and could equally be another type of legacy terminal device, including a device that has the capability to support EDT, but is currently not doing so. The conventional/legacy terminal device 506 comprises transceiver circuitry 506a (which may also be referred to as a transceiver/transceiver unit) for transmission and reception of wireless signals and processor circuitry 506b (which may also be referred to as a processor/processor unit) configured to control the device 506. The processor circuitry 506b may comprise various sub-units/sub-circuits for providing functionality as explained further herein. These sub-units may be implemented as discrete hardware elements or as appropriately configured functions of the processor circuitry. Thus the processor circuitry 506b may comprise circuitry which is suitably configured/programmed to provide the desired functionality using conventional programming/configuration techniques for equipment in wireless telecommunications systems. The transceiver circuitry 506a and the processor circuitry 506b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the legacy (non-EDT) terminal device 506 will in general comprise various other elements associated with its operating functionality.

In this example, it is assumed the second terminal device 508 is a machine-type communication (MTC) terminal device 508 adapted to support EDT (i.e. the second terminal device may be referred to as an EDT terminal device/UE). In this regard, the second terminal device 508 may be a reduced capability terminal device, for example a terminal device able to operate on a restricted bandwidth as compared to conventional terminal devices (i.e. what might be referred to as a narrowband device). However, it will be appreciated this represents merely one specific implementation of approaches in accordance with embodiments of the disclosure, and in other cases, the same principles may be applied in respect of terminal devices that support EDT but which are not reduced capability terminal devices, but may, for example, comprise smartphone terminal devices, or indeed any other form of terminal device, that may be operating in a wireless telecommunications system. It will be appreciated that an EDT terminal device may also function as a non-EDT/legacy terminal device, e.g. when it does not want to use EDT.

The EDT terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing desired functionality as explained further herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 4 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may comprise various sub-units/sub-circuits for providing desired functionality as explained further herein. These sub-units may be implemented as discrete hardware elements or as appropriately configured functions of the processor circuitry. Thus the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality.

Thus, the base station 504 is configured to communicate data with both the legacy terminal device 506 and the EDT terminal device 508 according to an embodiment of the disclosure over respective communication links 510, 512. The base station 504 is configured to communicate with the legacy terminal device 506 over the associated radio communication link 510 and with the EDT UE 508 over the associated radio communication link 512 generally following the established principles of LTE-based communications, apart from using modified random access procedures in accordance with certain embodiments of the present disclosure as described herein.

One aspect of certain embodiments of the disclosure is that the base station is adapted to separately/independently configure Common Search Spaces for at least one control message identifying radio resources for a random access procedure message for each of the legacy terminal device (or EDT-capable terminal device not requesting for EDT) and for the EDT-capable terminal device. That is to say, the base station may operate to communicate with a first class (group/type) of terminal device, such as the non-EDT first terminal device, using a first random access procedure and to communicate with a second class (group/type) of terminal device, e.g. the EDT capable second terminal device, using a second random access procedure, wherein the first and second random access procedures differ by virtue of a scheduling message for one procedure being associated with a first common search space which is configured separately from a second common search space for a corresponding scheduling message for the other procedure. Apart from this difference in the common search space configured for a scheduling control message, in so far as the first and second random access procedures comprise corresponding steps, these may otherwise be the same in terms of the general sequence/series of random access messages that comprise each of the procedures, and in particular each procedure may be generally based on a random access message sequence corresponding to that shown in FIG. 2. In this regard it will be appreciated that while the random access procedures may be generally based on the approach represented in FIG. 2, they need not comprise steps corresponding to all the steps represented in FIG. 2. For example, the second random access procedure which uses EDT might not comprise steps corresponding to steps S4 and/or S5 in FIG. 2 as the procedure may instead be deemed complete when the EDT data has been transmitted in step S3, or after step S4, for example if contention resolution is needed. Although in general the first and second common search spaces will be different, for example in terms of comprising different frequency and/or time radio resources (potentially with some overlap), in principle there may be occasions in which a base station may configure the first and second common search spaces for the same radio resources. That is to say, what is significant for certain embodiments of the disclosure is that the first and second common search spaces may be separately configured so they can be configured for different radio resources, even if at some times they are configured to comprise the same resources.

Figure 5:
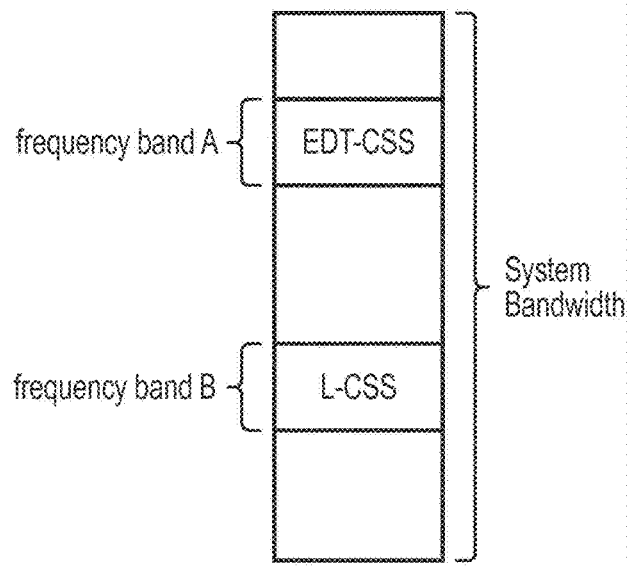
FIG. 5 schematically represents an example arrangement of different common search spaces for use by different types of terminal device in different frequency bands.

In one embodiment, the CSS (common search space) which is differently configured for the legacy and EDT-capable terminal devices is the CSS used to schedule the random access response (RAR) for each of the random access procedures. That is to say, in accordance with certain embodiments of the disclosure, the CSS for RAR for EDT capable UEs (EDT-CSS) and the CSS for legacy UEs (L-CSS) may be independently configured. An example of this is schematically shown in FIG. 5 which represents a first common search space (L-CSS) for a RAR scheduling control message for a legacy device configured within frequency band A and a second common search space (EDT-CSS) for a RAR scheduling control message for an EDT-capable device configured within frequency band B, wherein frequency band A and frequency band B are at different frequencies within the overall system frequency bandwidth. Although the example represented in FIG. 5 utilises different frequency resources for the first and second CSS, in other cases the two CSS may instead be separated by using different time resources, or a combination of different time and frequency resources.

Thus, after transmitting a PRACH preamble (e.g. in a step of the random access process corresponding to step S1 in FIG. 2), an EDT capable UE will monitor the EDT-CSS for a scheduling message allocating resources for the RAR message transmitted by the base station in response to receiving the PRACH preamble. In an LTE-based network the scheduling message in the EDT-CSS may correspond to an MPDCCH carrying a DCI that schedules the RAR. On the other hand, a legacy UE would, after transmitting a PRACH preamble, monitor the L-CSS for a possible DCI that schedules the RAR. This approach of separately configured CSSs for EDT and non-EDT terminal devices enables the eNB to provide a separate RAR for an EDT capable UE and a legacy UE, even if they both use the same preamble, and so therefore can provide different UL grants in each of the RARs such that the UEs can be allocated different uplink resources for their respective Message 3s, which can help reduce contention/interference at this stage of their respective random access procedures, and more efficiently allow more resources to be allocated for Message 3 for EDT-capable terminal devices than for legacy terminal devices. The eNB can also help reduce contention/interference by allocating resources for only one of the two types of terminal device using only one of the CSS, for example, the eNB might not schedule a legacy UE by only sending a DL grant (scheduling control message) for RAR in the EDT-CSS but not the L-CSS.

Figure 6:
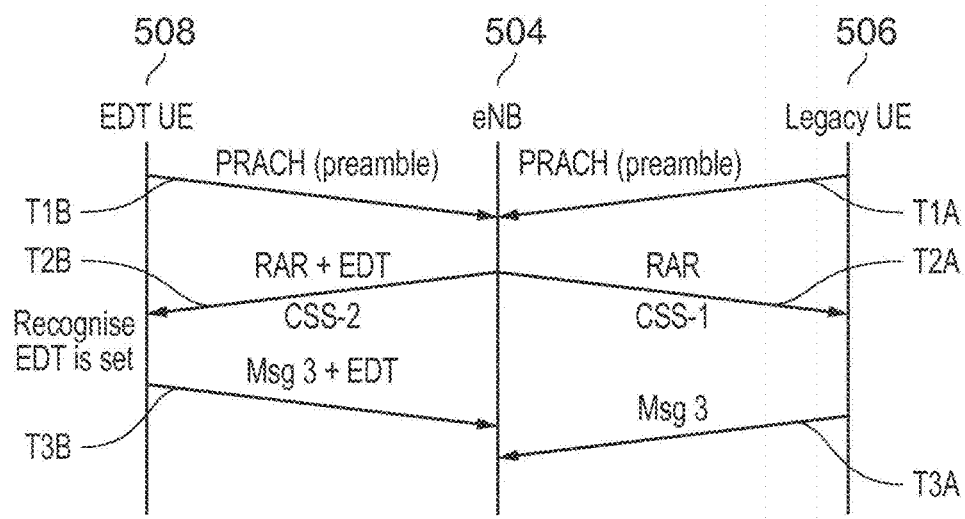
FIGS. 6 to 8 are signalling ladder diagrams schematically representing some operating aspects of wireless telecommunications systems in accordance with certain embodiments of the disclosure.

FIG. 6 is a ladder diagram schematically showing steps of first and second random access procedures respectively undertaken by the legacy terminal device 506 (right-hand node in FIG. 6), the EDT-capable terminal device 508 (left-hand node in FIG. 6), and the base station 504 (centre node in FIG. 6) represented in FIG. 4 in accordance with certain embodiments of the disclosure. As already mentioned, it will be appreciated aspects of this operation which are not specifically described herein, for example the particular signalling protocols adopted, may be implemented in accordance with conventional techniques for communicating in wireless telecommunications systems. It will further be appreciated the process of FIG. 6 for each terminal device is closely based on the process represented in FIG. 2, and aspects of FIG. 6 which correspond with aspects of FIG. 2 are not discussed in detail in the interests of brevity.

For the scenario represented in FIG. 6 it is assumed the base station has previously configured a first CSS (CSS-1) for legacy terminal devices (or EDT-capable terminal devices when not requesting for EDT) to use for receiving a scheduling message for RAR and a second, different, CSS (CSS-2) for EDT-capable terminal devices to use for receiving a scheduling message for RAR in accordance with the principles discussed above. The manner in which the individual CSSs are selected may be in accordance with conventional techniques for establishing a CSS to use for receiving a scheduling message for RAR, albeit in accordance with embodiments of the disclosure this is done twice to provide respective CSSs for the two types of terminal device. The indication of the respective CSSs may be communicated to the terminal devices in various ways, for example in system information signalling, e.g. SIB (system information block) signalling in an LTE-context and/or in prior UE-specific RRC signalling.

For the scenario represented in FIG. 6 it is assumed both the legacy terminal device 506 and the EDT-capable terminal device determine, by coincidence, they should initiate a random access procedure at around the same time. This may be, for example, because the legacy terminal device wishes to transition to an RRC connected mode to uplink data (i.e. transmit uplink data to the base station) and the EDT-capable terminal wishes to uplink data (i.e. transmit uplink data to the base station) in an EDT approach (i.e. as part of a random access procedure as discussed above). It will be appreciated the specific reasons why the terminal devices have data to uplink and the information content of the data are not significant to the principles described herein.

Thus, as schematically indicated in steps T1A and T1B of the signalling represented in FIG. 6, the legacy terminal device 506 and the EDT-capable terminal device 508 each transmit a PRACH preamble to the base station 504, and in this example scenario are assumed to have selected the same PRACH preamble (e.g. one of the preambles in the EDT set in FIG. 3) and the same transmission resources to do this.

On detecting a terminal device has transmitted a preamble from the EDT set of preambles it is assumed here the base station decides it will allow the use of EDT (if it is needed—at this stage the base station does not know if a received PRACH preamble has come from an EDT-capable UE). This determination may be based on the extent to which the base station currently has sufficient resources available to support EDT, for example having regard to conventional scheduling decision processes in wireless telecommunications systems. It may be noted that in general the base station will typically not be aware that more than one UE has sent the same preamble.

Thus in response to detecting a terminal device has transmitted a preamble from the EDT set, and having determined to allow EDT over Message 3, the base station transmits a first RAR response that is scheduled using the first (legacy) CSS (CSS-1), as indicted in FIG. 6 in step T2A and transmits a second RAR response that is scheduled using the second (legacy) CSS (CSS-2), as indicted in FIG. 6 in step T2B. The second RAR response of step T2B indicates EDT is available (e.g. based on setting an EDT flag using one of the reserved bits in the RAR as discussed above). Thus the legacy UE 506 searches for a scheduling message for a response to its random access request message of step T1A using CSS-1, and receives this in step T2A whereas the EDT-capable UE 508 searches for a scheduling message for a response to its random access request message of step T1B using CSS-2, and receives this in step T2B. Significantly, the contents of the RAR message scheduled using CSS-1 and the RAR message scheduled using CSS-2 can be different (because they can be scheduled for different resources). Thus the first RAR received by the legacy device 506 in step T2A may allocate uplink resources for Message 3 for the legacy device 506 in the usual way, and the legacy device 506 may transmit its Message 3 accordingly, as indicated in FIG. 6 in step T3A. In parallel, the second RAR received by the EDT-capable terminal device 508 in step T2B may allocate uplink resources for Message 3 for the EDT-capable terminal device 506 which are different from those allocated to the legacy device. The allocation of resources identified in the RAR scheduled using CSS-2 may thus allow for EDT data to be included with Message 3, in accordance with proposed approaches for EDT, and the EDT-capable device 508 may accordingly transmit its Message 3 with EDT data as indicated in FIG. 6 in step T3B.

Following the processing steps represented in FIG. 6 the respective terminal devices may continue in accordance with known approaches. For example the legacy device 506 may continue to complete the RRC connection procedure while the EDT-capable device, having sent its EDT data in step T3B may return to its previous state.

Thus in accordance with this approach the use of differently configurable common search spaces for a scheduling message (in this case a scheduling message for RAR) for different types of terminal device (i.e. terminal devices associated with different message sizes/amounts of data for one their random access procedure messages), can help reduce contention/interference for the terminal devices' respective random access procedures. It will be appreciated an EDT-capable UE may decide to adopt the legacy RACH procedure (i.e. search the CSS configured for legacy devices and transmit Message 3 on the resources allocated by the RAR scheduled using the legacy CSS), for example when it does not wish to use EDT but wishes to establish a conventional RRC connection, e.g. to exchange a greater amount of data than EDT supports.

In another example the said different CSSs may be those used to schedule a retransmission for Message 3. As with the above example the different CSSs can be configured in different frequency and/or time resources. This approach recognizes that the CSS scheduling the RAR and the CSS scheduling the retransmission for Message 3 may be configured separately (i.e. they can be different) and if a collision occurs for an initial Message 3 transmission for two terminal devices, the respective Message 3s are likely to be received at a poor SINR (signal to interference plus noise ratio) due to interference from the colliding UE, and so a retransmission may be more likely to be required. Configuring different CSSs for EDT-capable and legacy UEs can allow the eNB to schedule different resources for the Message 3 retransmission for each type of UE, therefore helping avoid a scenario in which retransmissions of Message 3 for legacy and EDT-capable terminal devices continue to interfere with each other.

Thus a common search space for scheduling RAR for EDT-capable terminal devices may be different from a common search space for scheduling a retransmission of Message 3 for EDT-capable terminal devices. The common search space for scheduling RAR for EDT-capable terminal devices may in some cases be the same as the common search space for scheduling RAR for legacy (non-EDT) terminal devices.

Thus in another example EDT-capable UEs and legacy UEs may share the same CSS for RAR but the CSS configured for control messages scheduling Message 3 retransmissions for EDT-capable UEs and legacy UEs may be different. This approach recognizes that if a preamble collision between an EDT-capable UE and a legacy UE occurs (i.e. both UEs transmit the same PRACH preamble at the same time), using the same CSS to schedule the RAR for both types of UE would result in the eNB receiving two types of Message 3, i.e. a first Message 3 from the legacy terminal device and a second Message 3 from the EDT-capable terminal device. Depending on the eNB scheduler, it can then decide to receive only one of the Message 3 types by sending a HARQ feedback to only one of them using a separate CSS. For example, an eNB may be able to decode one of the message 3s, and with signal processing, e.g. cancellation to remove the contribution of the decoded message 3 from the signal, determine there was another message 3 that it cannot decode properly (e.g. due to poor SNR caused by interference). In this case the base station can request retransmission for the message 3 it could not decode from its initial transmission. In another case the base station may be unable to decode any message 3 (e.g. due to poor SNR caused by interference), but elect only to serve an EDT UE and so request retransmission from the EDT UE, or elect only to serve a legacy UE and so request retransmission from the legacy UE. An example of such an approach when an EDT UE and a legacy UE transmit the same preamble to the eNB is schematically shown in FIG. 7.

Figure 7:
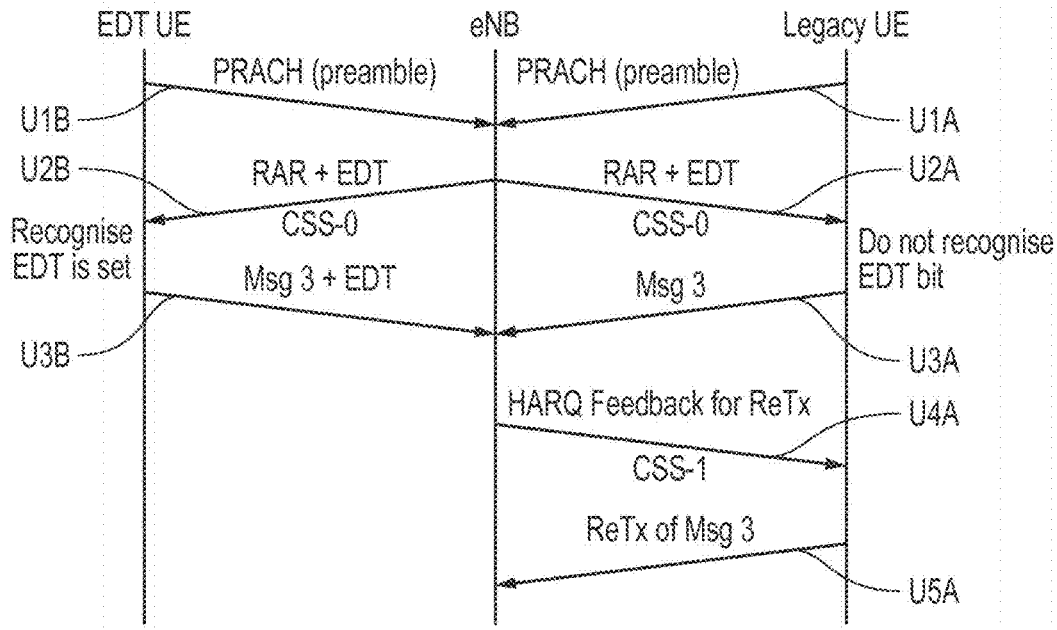

FIG. 7 is a ladder diagram schematically showing steps of first and second random access procedures respectively undertaken by the legacy terminal device 506 (right-hand node in FIG. 7), the EDT-capable terminal device 508 (left-hand node in FIG. 7), and the base station 504 (centre node in FIG. 7) represented in FIG. 3 in accordance with certain embodiments of the disclosure. Various aspects of FIG. 7 are similar to, and will be understood from, corresponding aspects of FIG. 6. As already mentioned, it will be appreciated aspects of this operation which are not specifically described herein, for example the particular signalling protocols adopted, may be implemented in accordance with conventional techniques for communicating in wireless telecommunications systems. It will further be appreciated the process of FIG. 7 for each terminal device is closely based on the process represented in FIG. 2, and aspects of FIG. 7 which correspond with aspects of FIG. 2 are not discussed in detail in the interests of brevity.

For the scenario represented in FIG. 7 it is again assumed both the legacy terminal device 506 and the EDT-capable terminal device 508 determine, by coincidence, they should initiate a random access procedure at around the same time. Thus, as schematically indicated in steps U1A and U1B of the signalling represented in FIG. 7, the legacy terminal device 506 and the EDT-capable terminal device 508 each transmit a PRACH preamble to the base station 504, and in this example scenario are again assumed to have selected the same PRACH preamble (e.g. one of the preambles in the EDT set in FIG. 3) and transmission resources to do this.

On detecting a terminal device has transmitted a preamble from the EDT set of preambles it is assumed here the base station decides it will allow the use of EDT. This determination may be based on the extent to which the base station currently has sufficient resources available to support EDT, for example having regard to conventional scheduling decision processes in wireless telecommunications systems.

Thus in response to detecting a terminal device has transmitted a preamble from the EDT set, and having determined to allow EDT over Message 3, the base station transmits a RAR response which indicates EDT is available (e.g. based on setting an EDT flag using one of the reserved bits in the RAR as discussed above). In this example the same common search space (CSS-0) is used for the control message scheduling the RAR for both types of UE. Thus both UEs receive the same RAR message (with the EDT indicator set) which indicates the same uplink resources for Message 3, as schematically indicated in FIG. 7 in steps U2A and U2B (i.e. steps U2A and U2B represent the two different UEs receiving the same message from the base station).

On receiving the RAR in step U2B the EDT UE identifies from the EDT flag the RAR is allocating resources for EDT in Message 3 and responds by transmitting its Message 3 with the EDT data in step U3B. This may be performed generally in accordance with proposed techniques for EDT.

Similarly, on receiving the RAR in step U2A the legacy UE does not recognise (i.e. it ignores) the EDT flag and interprets the RAR as allocating resources for Message 3 in the usual way and responds by transmitting its conventional (i.e. non-EDT) Message 3 in step U3A in accordance with conventional techniques.

The base station blind decodes for both Message 3 formats and is assumed here to successfully receive the Message 3 (including EDT data) from the EDT capable UE 508. The EDT-capable device, having sent its EDT data in step U3B may return to its previous state, potentially after receiving appropriate acknowledgment signalling for its Message 3.

However, the eNB is able to recognize that there was also a Message 3 transmitted by a legacy terminal device (e.g. from its decoding process). For example, the eNB could perform successive interference cancellation techniques in order to subtract a correctly received EDT Msg3 from the composite received signal, leaving a residual signal that only comprises the legacy Msg3. Based on a characteristic of the residual signal, such as the frequency span of the residual signal, the eNB may thus determine that a legacy Msg3 had also been transmitted. In another example, the eNB may analyse received reference signals and determine that a received power in the reference signals is greater for a time or frequency duration that aligns with a legacy Msg3 colliding with an EDT Msg3, and thereby detect there has been a collision). In response to this the eNB 504 transmits HARQ feedback requesting a retransmission of the legacy Message 3, as indicated in FIG. 7 in step U4A. In accordance with this example implementation, the scheduling message allocating the uplink resources for the retransmission of the Message 3 for legacy terminal devices uses a common search space (e.g. CSS-1) which is configured for the legacy UEs but not configured for the EDT-capable UEs because they are instead configured to use a different common search space (e.g. CSS-2) to seek scheduling messages for a retransmission of Message 3. The different CSSs for scheduling Message 3 transmissions for each type of UE may be established and communicated to the UEs using the same principles as discussed above in relation to FIG. 6 (e.g. using SIB and/or prior UE-specific RRC signalling). Consequently, while the legacy UE receives the control message scheduling the Message 3 retransmission, and responds by retransmitting its Message 3 in step U5A, the EDT-capable UE does not receive the control message scheduling a Message 3 retransmission (because it is not searching the corresponding CSS). Thus the legacy UE is able to retransmit its Message 3 without interference from the EDT-capable UE. The legacy device 506 may then continue to complete the RRC connection procedure in the usual way.

Figure 8:
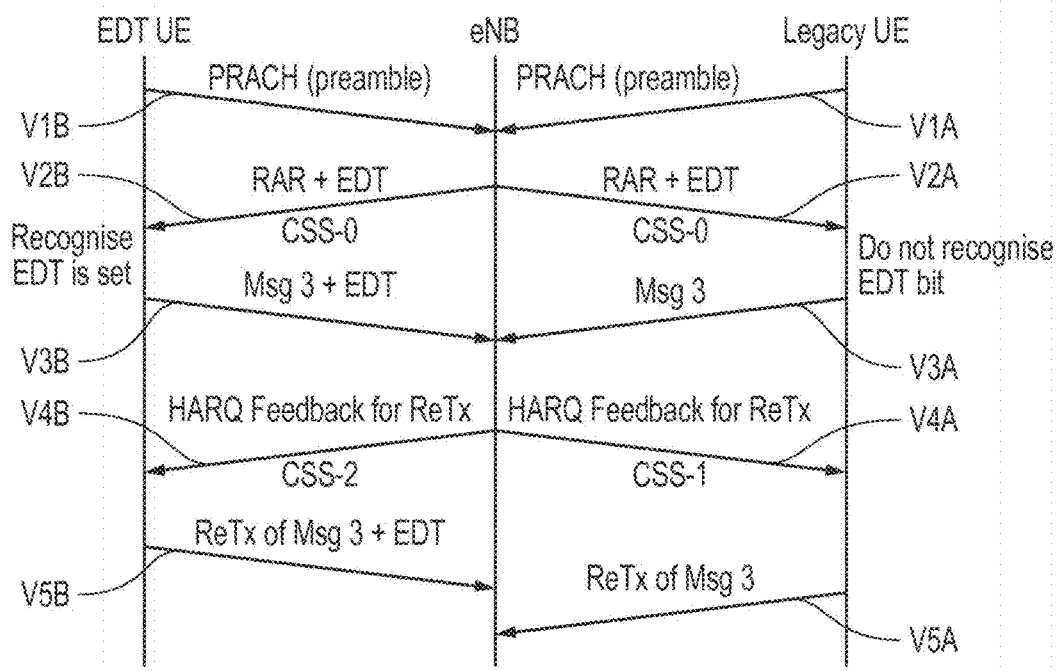

FIG. 8 is similar to and will be understood from FIG. 7 but represents a scenario in which the eNB requests a retransmission of Message 3 from both the EDT-capable UE and the legacy UE. Steps V1A, V1B, V2A, V2B, V3A, V3B, V4A and V5A in FIG. 8 are similar to, and will be understood from, the corresponding steps U1A, U1B, U2A, U2B, U3A, U3B, U4A and U5A in FIG. 7. Thus, as for FIG. 7, in the scenario represented in FIG. 8 the EDT-capable UE 508 and the legacy UE 506 transmit the same preamble (steps V1A and V1B) and the eNB 504 responds to both UEs with a RAR scheduled on a common search space (e.g. CSS-0) configured for RAR scheduling for both types of UE with the relevant indicator set to indicate to the EDT-capable UE that EDT is to be scheduled (steps V2A and V2B). Both types of UE transmit their Message 3, where the EDT capable UE also transmits uplink data with its Message 3 as in FIG. 7 (steps V3A and V3B). In this example scenario it is assumed the eNB fails to detect either of the Message 3 transmissions, and so sends a HARQ feedback request for Message 3 retransmission for both types of UEs (steps V4A and V4B). In accordance with this example implementation, and as discussed above for FIG. 7, the scheduling message allocating the uplink resources for the retransmission of the Message 3 for legacy terminal devices uses a first common search space (e.g. CSS-1) whereas the scheduling message allocating the uplink resources for the retransmission of the Message 3 for EDT-capable terminal devices uses a second common search space (e.g. CSS-2). As noted above, the different CSSs for scheduling Message 3 transmissions for each type of UE may be established and communicated to the UEs using the same principles as discussed above in relation to FIG. 6 (e.g. using SIB and/or prior UE-specific RRC signalling). Because the eNB has established the different CSSs for scheduling retransmissions of Message 3 for the different terminal devices the eNB is able to allocate different uplink resources for the Message 3 retransmissions to help avoid interference between the retransmissions from the different types of terminal device (as schematically indicted in FIG. 8 in steps V5A ad V5B).

It will be appreciated there are various modifications that can be made for the approaches described herein. For example in a modification of the approach represented in FIG. 8 the RAR received by the EDT-capable UE in step V2B may include an indication of whether the EDT capable UE should use CSS-2 or CSS-1 for searching for downlink control information scheduling a Message 3 retransmission. This approach provides the eNB with flexibility to decide which CSS to use. For example, if the eNB decides not to enable EDT for an EDT capable UE (e.g. due to limitations on available resources) it can instruct the UE to monitor the CSS-1 (the CSS configured for legacy UEs) rather than CSS-2 (the CSS configured for EDT-capable UEs). This indication could be implicitly signalled to the UE, for example an EDT-capable UE receiving a RAR that indicates EDT is not allowed (such that the UE needs to RRC connect to uplink its data) may take this to implicitly indicate it should monitor the CSS configured for legacy devices for scheduling Message 3 retransmissions.

In another embodiment, the configuration of the EDT-CSS is RRC configured. This embodiment does not mean that the EDT-CSS configuration cannot also be signalled in the SIB. Here the UE specific RRC configuration overwrites the configuration signalled in the SIB. This is useful for non-contention based RACH where the eNB knew the UE that is performing the RACH e.g. due to a PDCCH order. An implementation of this is where the non-contention based RACH, which is explicitly signalled by the eNB using a DCI, uses the RRC configured EDT-CSS whilst contention based RACH uses the SIB signalled EDT-CSS configurations.

Thus there has been described a method of operating a base station in a wireless telecommunications system to support a first random access procedure for a first terminal device of a first type and a second random access procedure for a second terminal device of a second type, wherein a message size/amount of data for an uplink message of the second random access procedure is greater than a message size/amount of data for a corresponding uplink message of the first random access procedure, and wherein the method comprises: establishing/configuring a first common search space for use with the first random access procedure; establishing/configuring a second common search space for use with the second random access procedure; exchanging a first series of random access procedure messages with the first terminal device, wherein a first scheduling message indicating radio resources for at least one of the first series of random access procedure messages is transmitted by the base station to the first terminal device on radio resources in the first common search space, and exchanging a second series of random access procedure messages with the second terminal device, wherein a second scheduling message indicating radio resources for at least one of the second series of random access procedure messages is transmitted by the base station to the second terminal device on radio resources in the second common search space.

It will be appreciated that while a message of a random access procedure including EDT data may in some cases have a message size which is larger than the message size of a corresponding message in a random access procedure that does not include EDT data, this is not always the case. For example, in some cases the EDT random access procedure message containing the additional data may have the same message size as the corresponding legacy (non-EDT) random access procedure message, but a different coding scheme.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored on a SIM card. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type terminal device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a terminal device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a network infrastructure equipment in a wireless telecommunications system to support a first random access procedure for a first terminal device and a second random access procedure for a second terminal device, wherein an amount of data for an uplink message of the second random access procedure is greater than an amount of data for a corresponding uplink message of the first random access procedure, and wherein the method comprises: establishing a first common search space for use with the first random access procedure; establishing a second common search space for use with the second random access procedure; exchanging a first series of random access procedure messages with the first terminal device, wherein a first scheduling message indicating radio resources for at least one of the first series of random access procedure messages is transmitted by the network infrastructure equipment to the first terminal device using radio resources in the first common search space, and exchanging a second series of random access procedure messages with the second terminal device, wherein a second scheduling message indicating radio resources for at least one of the second series of random access procedure messages is transmitted by the network infrastructure equipment to the second terminal device using radio resources in the second common search space.

Paragraph 2. The method of paragraph 1, wherein the first common search space comprises a first set of frequency resources and the second common search space comprises a second set of frequency resources which is different from the first set of frequency resources.

Paragraph 3. The method of paragraph 1 or 2, wherein the first common search space comprises a first set of time resources and the second common search space comprises a second set of time resources which is different from the first set of time resources.

Paragraph 4. The method of any one of paragraphs 1 to 3, wherein the first series of random access procedure messages comprises a first random access request message received by the network infrastructure equipment from the first terminal device, a first random access response message transmitted from the network infrastructure equipment to the first terminal device in response to receiving the first random access request message, and a first message three received by the network infrastructure equipment from the first terminal device using radio resources allocated in the first random access response message; and the second series of random access procedure messages comprises a second random access request message received by the network infrastructure equipment from the second terminal device, a second random access response message transmitted from the network infrastructure equipment to the second terminal device in response to receiving the second random access request message, and a second message three received by the network infrastructure equipment from the terminal device using radio resources allocated by the second random access response message.

Paragraph 5. The method of paragraph 4, wherein the second message three is the uplink message of the second random access procedure having an amount of data greater than the amount of data for the corresponding uplink message of the first random access procedure, the corresponding uplink message of the first random access procedure being the first message three.

Paragraph 6. The method of paragraph 4 or 5, wherein the first scheduling message transmitted by the network infrastructure equipment to the first terminal device using radio resources in the first common search space indicates radio resources for the first random access response message; and the second scheduling message transmitted by the network infrastructure equipment to the second terminal device using radio resources in the second common search space indicates radio resources for the second random access response message.

Paragraph 7. The method of paragraph 4 or 5, wherein the first scheduling message transmitted by the network infrastructure equipment to the first terminal device using radio resources in the first common search space indicates radio resources for a retransmission of the first message three; and the second scheduling message transmitted by the network infrastructure equipment to the second terminal device using radio resources in the second common search space indicates radio resources for a retransmission of the second message three.

Paragraph 8. The method of paragraph 7, wherein a scheduling message transmitted by the network infrastructure equipment to the first terminal device for the first random access response message and a scheduling message transmitted by the network infrastructure equipment to the second terminal device for the second random access response message are transmitted by the network infrastructure equipment to the respective terminal devices using radio resources in the same common search space.

Paragraph 9. The method of any one of paragraphs 4 to 8, wherein the second random access response message comprises an indication the second random access response message is associated with the second random access procedure.

Paragraph 10. The method of any one of paragraphs 4 to 9, wherein the second random access response message comprises an indication of whether the second terminal device should search the first or the second common search space a subsequent scheduling message.

Paragraph 11. The method of any one of paragraphs 1 to 10, further comprising the network infrastructure equipment transmitting an indication of the second common search space to the second terminal device in system information, SI, signalling.

Paragraph 12. The method of any one of paragraphs 1 to 11, further comprising the network infrastructure equipment transmitting an indication of the second common search space to the second terminal device in radio resource control, RRC, signalling.

Paragraph 13. A network infrastructure equipment for use in a wireless telecommunications system to support a first random access procedure for a first terminal device and a second random access procedure for a second terminal device, wherein an amount of data for an uplink message of the second random access procedure is greater than an amount of data for a corresponding uplink message of the first random access procedure, wherein the network infrastructure equipment comprises controller circuitry and transceiver circuitry configured such that the network infrastructure equipment is operable to: establish a first common search space for use with the first random access procedure; establish a second common search space for use with the second random access procedure; exchange a first series of random access procedure messages with the first terminal device, wherein at least one of the first series of random access procedure messages is transmitted using radio resources indicated by a first scheduling message transmitted by the network infrastructure equipment to the first terminal device using radio resources in the first common search space, and exchange a second series of random access procedure messages with the second terminal device, wherein at least one of the second series of random access procedure messages is transmitted using radio resources indicated by a second scheduling message transmitted by the network infrastructure equipment to the second terminal device using radio resources in the second common search space.

Paragraph 14. Integrated circuitry for a network infrastructure equipment for use in a wireless telecommunications system to support a first random access procedure for a first terminal device and a second random access procedure for a second terminal device, wherein an amount of data for an uplink message of the second random access procedure is greater than an amount of data for a corresponding uplink message of the first random access procedure, wherein the integrated circuitry comprises controller circuitry and transceiver circuitry configured to operate together such that the network infrastructure equipment is operable to: establish a first common search space for use with the first random access procedure; establish a second common search space for use with the second random access procedure; exchange a first series of random access procedure messages with the first terminal device, wherein at least one of the first series of random access procedure messages is transmitted using radio resources indicated by a first scheduling message transmitted by the network infrastructure equipment to the first terminal device using radio resources in the first common search space, and exchange a second series of random access procedure messages with the second terminal device, wherein at least one of the second series of random access procedure messages is transmitted using radio resources indicated by a second scheduling message transmitted by the network infrastructure equipment to the second terminal device using radio resources in the second common search space.

Paragraph 15. A method of operating a terminal device in a wireless telecommunications system in which a network infrastructure equipment supports first and second random access procedures for the terminal device, wherein an amount of data for an uplink message of the second random access procedure is greater than an amount of data for a corresponding uplink message of the first random access procedure, and wherein the method comprises: determining the terminal device should implement a random access procedure; selecting whether to follow the first random access procedure or the second random access procedure according to whether the terminal device intends to make use of the greater amount of data for the second random access procedure; determining a common search space to use for receiving a scheduling message indicating radio resources for a random access procedure message transmitted by the network infrastructure equipment according to whether the terminal device has selected to follow the first random access procedure or the second random access procedure; and monitoring for the scheduling message using the selected common search space.

16. A terminal device for use in a wireless telecommunications system in which a network infrastructure equipment supports first and second random access procedures for the terminal device, wherein an amount of data for an uplink message of the second random access procedure is greater than an amount of data for a corresponding uplink message of the first random access procedure, wherein the terminal device comprises controller circuitry and transceiver circuitry configured such that the terminal device is operable to: determine the terminal device should implement a random access procedure; select whether to follow the first random access procedure or the second random access procedure according to whether the terminal device intends to make use of the greater amount of data for the second random access procedure; determine a common search space to use for receiving a scheduling message indicating radio resources for a random access procedure message transmitted by the network infrastructure equipment according to whether the terminal device has selected to follow the first random access procedure or the second random access procedure; and monitor for the scheduling message using the selected common search space.

Paragraph 17. Circuitry for a terminal device for use in a wireless telecommunications system in which a network infrastructure equipment supports first and second random access procedures for the terminal device, wherein an amount of data for an uplink message of the second random access procedure is greater than an amount of data for a corresponding uplink message of the first random access procedure, wherein the circuitry comprises controller circuitry and transceiver circuitry configured such that the terminal device is operable to: determine the terminal device should implement a random access procedure; select whether to follow the first random access procedure or the second random access procedure according to whether the terminal device intends to make use of the greater amount of data for the second random access procedure; determine a common search space to use for receiving a scheduling message indicating radio resources for a random access procedure message transmitted by the network infrastructure equipment according to whether the terminal device has selected to follow the first random access procedure or the second random access procedure; and monitor for the scheduling message using the selected common search space.

REFERENCES

[1] RP-161464, "Revised WID for Further Enhanced MTC for LTE," Ericsson, 3GPP TSG RAN Meeting #73, New Orleans, USA, Sep. 19-22, 2016
[2] RP-161901, "Revised work item proposal: Enhancements of NB-IoT", Huawei, HiSilicon, 3GPP TSG RAN Meeting #73, New Orleans, USA, Sep. 19-22, 2016
[3] RP-170732, "New WID on Even further enhanced MTC for LTE," Ericsson, Qualcomm, 3GPP TSG RAN Meeting #75, Dubrovnik, Croatia, Mar. 6-9, 2017
[4] RP-170852, "New WID on Further NB-IoT enhancements," Huawei, HiSilicon, Neul, 3GPP TSG RAN Meeting #75, Dubrovnik, Croatia, Mar. 6-9, 2017
[5] Holma H. and Toskala A, "LTE for UMTS OFDMA and SC-FDMA based radio access", John Wiley and Sons, 2009

The invention claimed is:

1. A method of operating a terminal device in a wireless telecommunications system in which a network infrastructure equipment supports first and second random access procedures for the terminal device, wherein an amount of data for an uplink message of the second random access procedure is greater than an amount of data for a corresponding uplink message of the first random access procedure, and wherein the method comprises:
  determining the terminal device should implement a random access procedure;
  selecting whether to follow the first random access procedure or the second random access procedure according to whether the terminal device intends to make use of the greater amount of data for the second random access procedure;
  determining a common search space to use for receiving a scheduling message indicating radio resources for a random access procedure message transmitted by the network infrastructure equipment according to whether the terminal device has selected to follow the first random access procedure or the second random access procedure; and
  monitoring for the scheduling message using the selected common search space.

2. The method of claim 1, wherein
  a first common search space is established for use with the first random access procedure, and
  a second common search space is established for use with the second random access procedure.

3. The method of claim 2, wherein
  the first common search space comprises a first set of frequency resources and the second common search space comprises a second set of frequency resources which is different from the first set of frequency resources.

4. The method of claim 2, wherein
  the first common search space comprises a first set of time resources and the second common search space comprises a second set of time resources which is different from the first set of time resources.

5. The method of claim 2, further comprising:
  in a case of selecting to follow the first random access procedure, exchanging a first series of random access procedure messages with the network infrastructure equipment, wherein a first scheduling message indicating radio resources for at least one of the first series of random access procedure messages is received by the terminal device from the network infrastructure equipment using radio resources in the first common search space; and
  in a case of selecting to follow the second random access procedure, exchanging a second series of random access procedure messages with the network infrastructure equipment, wherein a second scheduling message indicating radio resources for at least one of the second series of random access procedure messages is received by the terminal device from the network infrastructure equipment using radio resources in the second common search space.

6. The method of claim 5, wherein
  the first series of random access procedure messages comprises a first random access request message transmitted by the terminal device to the network infrastructure equipment, a first random access response message received at the terminal device from the network infrastructure equipment in response to the first random access request message, and a first message three transmitted from the terminal device to the network infrastructure equipment using radio resources allocated in the first random access response message, and the second series of random access procedure messages comprises a second random access request message transmitted from the terminal device to the network infrastructure equipment, a second random access response message received by the terminal device from the network infrastructure equipment in response to the second random access request message, and a second message three transmitted from the terminal device to the network infrastructure equipment using radio resources allocated by the second random access response message.

7. The method of claim 6, wherein the second message three is the uplink message of the second random access procedure having an amount of data greater than the amount of data for the corresponding uplink message of the first random access procedure, the corresponding uplink message of the first random access procedure being the first message three.

8. The method of claim 6, wherein the first scheduling message received by the terminal device from the network infrastructure equipment using radio resources in the first common search space indicates radio resources for the first random access response message, and the second scheduling message received by the terminal device from the network infrastructure equipment using radio resources in the second common search space indicates radio resources for the second random access response message.

9. The method of claim 6, wherein the first scheduling message received by the terminal device from the network infrastructure equipment using radio resources in the first common search space indicates radio resources for a retransmission of the first message three; and the second scheduling message received by the terminal device from the network infrastructure equipment using radio resources in the second common search space indicates radio resources for a retransmission of the second message three.

10. The method of claim 6, wherein the second random access response message comprises an indication the second random access response message is associated with the second random access procedure.

11. The method of claim 6, wherein the second random access response message comprises an indication of whether the terminal device should search the first or the second common search space for a subsequent scheduling message.

12. The method of claim 2, further comprising: receiving, from the network infrastructure equipment, an indication of the second common search space in system information (SI) signalling.

13. The method of claim 2, further comprising: receiving, from the network infrastructure equipment, an indication of the second common search space in radio resource control (RRC) signalling.

14. A terminal device for use in a wireless telecommunications system that supports first and second random access procedures for the terminal device, wherein an amount of data for an uplink message of the second random access procedure is greater than an amount of data for a corresponding uplink message of the first random access procedure, wherein the terminal device comprises:
circuitry configured to
determine the terminal device should implement a random access procedure;
select whether to follow the first random access procedure or the second random access procedure according to whether the terminal device intends to make use of the greater amount of data for the second random access procedure;
determine a common search space to use for receiving a scheduling message indicating radio resources for a random access procedure message transmitted by the network infrastructure equipment according to whether the terminal device has selected to follow the first random access procedure or the second random access procedure; and
monitor for the scheduling message using the selected common search space.

15. The terminal device of claim 14, wherein a first common search space is established for use with the first random access procedure, and a second common search space is established for use with the second random access procedure.

16. The terminal device of claim 15, wherein the first common search space comprises a first set of frequency resources and the second common search space comprises a second set of frequency resources which is different from the first set of frequency resources.

17. The terminal device of claim 15, wherein the first common search space comprises a first set of time resources and the second common search space comprises a second set of time resources which is different from the first set of time resources.

18. The terminal device of claim 15, wherein the circuitry is configured to:
in a case of selecting to follow the first random access procedure, exchange a first series of random access procedure messages with the network infrastructure equipment, wherein a first scheduling message indicating radio resources for at least one of the first series of random access procedure messages is received by the terminal device from the network infrastructure equipment using radio resources in the first common search space; and
in a case of selecting to follow the second random access procedure, exchange a second series of random access procedure messages with the network infrastructure equipment, wherein a second scheduling message indicating radio resources for at least one of the second series of random access procedure messages is received by the terminal device from the network infrastructure equipment using radio resources in the second common search space.

19. The terminal device of claim 18, wherein the first series of random access procedure messages comprises a first random access request message transmitted by the terminal device to the network infrastructure equipment, a first random access response message received at the terminal device from the network infrastructure equipment in response to the first random access request message, and a first message three transmitted from the terminal device to the network infrastructure equipment using radio resources allocated in the first random access response message, and the second series of random access procedure messages comprises a second random access request message transmitted from the terminal device to the network infrastructure equipment, a second random access response message received by the terminal device from the network infrastructure equipment in response to the second random access request message, and a second message three transmitted from the terminal device to the network infrastructure equipment using radio resources allocated by the second random access response message.

20. A method of operating a terminal device in a wireless telecommunications system in which a network infrastructure equipment supports first and second random access procedures for the terminal device, wherein an amount of data for an uplink message of the second random access procedure is greater than an amount of data for a corresponding uplink message of the first random access procedure, and wherein the method comprises:

- determining the terminal device should implement a random access procedure;
- selecting whether to follow the first random access procedure or the second random access procedure according to an amount of data to be transmitted by the terminal device;
- determining a common search space to use for receiving a scheduling message indicating radio resources for a random access procedure message transmitted by the network infrastructure equipment according to whether the terminal device has selected to follow the first random access procedure or the second random access procedure; and
- monitoring for the scheduling message using the selected common search space.

* * * * *